TRANSFLUXOR CURRENT DETECTING CIRCUIT
Filed March 30, 1966
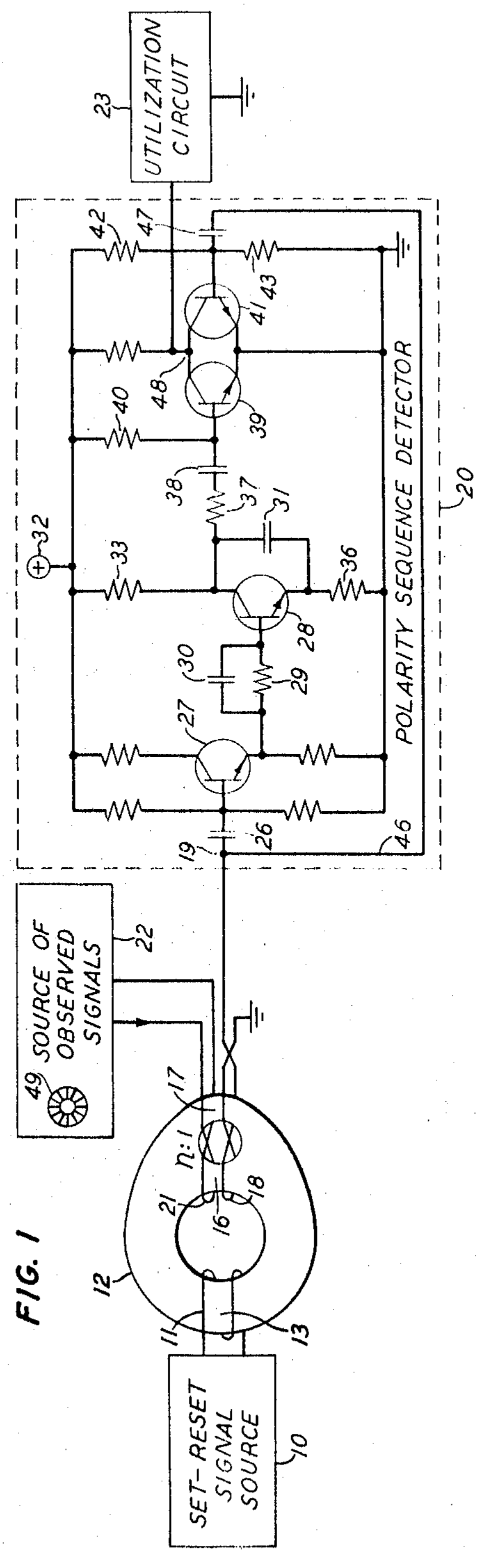
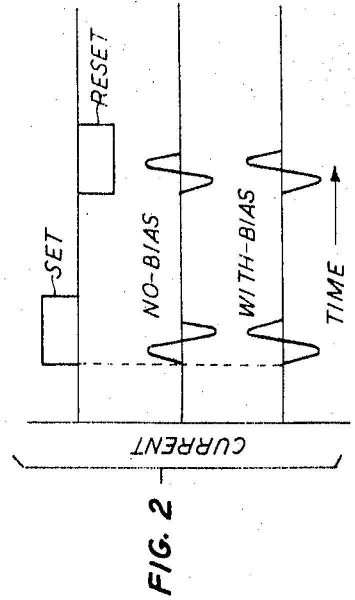
INVENTOR
R. R. SCHULZ
BY
Charles Scott Phelan
ATTORNEY United States Patent Office 3,459,958
Patented Aug. 5, 1969

3,459,958

TRANSFLUXOR CURRENT DETECTING CIRCUIT

Robert R. Schulz, Red Bank, N.J., assignor to Bell Telephone Laboratories, Incorporated, New York, N.Y., a corporation of New York Filed Mar. 30, 1966, Ser. No. 538,742
Int. Cl. H01f *27/42, 35/00*
U.S. Cl. 307—88 8 Claims

ABSTRACT OF THE DISCLOSURE

A transfluxor detecting circuit includes a biasing circuit to change the reluctance of at least one of two magnetic path sections defining the smaller aperture of the transfluxor. These sections have a known normal switching sequence when the transfluxor is set without bias. Current applied to the bias circuit changes the reluctance of the two sections so that the sequence of section switching is reversed. A polarity detector coupled to the sections responds to and indicates the sequence of section switching.

This invention relates to current detecting circuits and it relates more particularly to such circuits which employ transfluxors.

Circuits for detecting the presence of a current of a predetermined level have a wide variety of uses. One such use is in line scanners that may be employed, for example, in an electronic key service unit for a telephone system. Such a unit is employed to enable a telephone subscriber to select one of a plurality of different telephone lines or intercommunication lines by the operation of a corresponding key on his telephone set. Many considerations are involved in the design of a current detecting circuit. For example, there are questions of the adequacy of the current which is to be detected for actuating whatever indicating means is provided, and there are questions of the type of equipment that must be provided to respond to indicator actuation.

Multiaperture magnetic devices have been previously employed to detect the presence of a signal, and a wide variety of techniques for their use are known in the art. For example, in the copending application Ser. No. 241,442, filed Nov. 30, 1962, of J. N. Brown, Jr. and E. E. Newhall, a signal to be detected combines with an integrating magnetomotive force to cause one branch of a multiaperture device to switch faster than another. A figure-8 output winding on both of the branches receives a pulse of the switching of each branch and the output signal is integrated to determine whether or not an input signal was present. The polarity of the integrated output signal is also determined in order to distinguish between signal and noise. Of course, if a noise of substantial size should occur at an inopportune moment, the integrated resultant could have a polarity corresponding to the noise rather than a polarity corresponding to the desired signal.

It is, therefore, one object of the present invention to improve current detecting circuits.

It is another object to reduce the noise sensitivity of detecting circuits employing multiaperture devices such as transfluxors.

Still another object is to detect current level by means which utilize relatively simple detection circuits.

These and other objects of the invention are realized in an illustrative embodiment utilizing transient operating characteristics of a multiaperture magnetic device. Thus, a transfluxor is provided with a biasing circuit for changing the switching threshold, or effective reluctance, of at least one of the two magnetic path sections thereof which define the smaller transfluxor aperture. Such sections have a known switching sequence when the transfluxor is set in the absence of the bias. A current in the biasing circuit changes the effective reluctance of the one path with respect to the other so that the normal sequence of section switching is reversed. A polarity sequence detector is coupled to the two path sections to indicate the sequence of section switching in response to the setting of the transfluxor.

It is one feature of the invention that the bipolar transfluxor output signals, that heretofore required special circuit arrangements to permit the detection of a desired output signal, are now utilized to advantage to indicate the character of an input signal on a transfluxor bias circuit.

It is another feature that output pulse polarity sequence is detected so that no time gating is required to suppress ouput circuit effects resulting from the resetting of the magnetic detection device.

A further feature is that the signal detected can have a relatively small magnitude because it is not required to switch a magnetic device. It just biases the device to produce a detectable output signal sequence.

It is a further feature that the magnetic device bias circuit is provided with means for adjusting the magnetomotive force produced thereby so that a single device can detect at different selectable current thresholds in the bias circuit.

A more complete understanding of the invention and the various objects and features thereof may be obtained from a consideration of the following detailed description in connection with the appended claims and the attached drawing wherein:

FIG. 1 is a schematic diagram of a current detecting circuit in accordance with the invention; and FIG. 2 is a set of current-versus-time diagrams illustrating the operation of the invention.

In FIG. 1 a drive signal source 10 provides both set and reset drive signals to an input winding 11 of a multiaperture magnetic device 12 which is, in the illustrated embodiment, a two-hole transfluxor. The winding 11 is coupled to a large common branch 13 of the transfluxor 12. Branch 13 is sometimes called a major flux leg, and it and a smaller coupling branch 16, sometimes called a minor flux leg, define a large aperture of the device 12. A second coupling branch, or minor flux leg, 17 and the branch 16 define the smaller aperture of the device 12. The cross-sectional areas of the branches 16 and 17 are advantageously equal to one another, and their sum is equal to the cross-sectional area of the common branch 13. Thus, saturation of the branch 13 by a drive signal from source 10 necessarily saturates both of the branches 16 and 17. The operation of transfluxors is well known in the art and will not be extensively described in the present application. Briefly, however, a set pulse from the source 10 sets the device 12 to a clockwise saturated magnetic condition and a reset pulse restores the device 12 to a saturated remanent condition of counterclockwise flux. Set and reset pulses are shown in FIG. 2.

In a magnetic device such as the transfluxor 12 there are in effect two magnetic paths around the larger aperture of the device, and each includes a different one of the coupling branches 16 and 17. In the absence of the application of a biasing magnetomotive force to the coupling branches, the reluctance of the shorter inner path through the branch 16 is less than the reluctance of the longer outer path through the branch 17. Consequently, in the absence of a bias signal, a drive signal from the source 10 causes the branch 16 to switch before the switching of the branch 17. The sequential switching of these two branches produces a bipolar dipulse in an output winding 18 which is coupled in a figure-8 configuration to the branches 16 and 17. The winding 18 is connected, in accordance with the present invention, between ground and an input terminal 19 of a polarity sequence detector 20 which will be hereinafter described.

The wave diagrams in FIG. 2 illustrate a typical set current pulse that is supplied by source 10 and a resulting bipolar dipulse that is applied by way of the output winding 18 to the detector 20 in the absence of bias on the coupling branches of device 12. The positive-going portion of the no-bias current dipulse in FIG. 2 is produced by the switching of coupling branch 16 to the clockwise direction of magnetization around the larger transfluxor opening, and the negative-going portion of the setting dipulse in FIG. 2 is produced by the subsequent switching of the coupling branch 17 in a similar manner.

In accordance with the present invention a biasing magnetomotive force is applied to the transfluxor 12 to alter the switching threshold, or effective reluctance, of at least one of the coupling branches 16 and 17. For this purpose a bias winding 21 is coupled in a figure-8 configuration to the branches 16 and 17, and it is also connected to the output of a source 22 of signals which are to be observed by the current detecting circuit of FIG. 1.

Source 22 advantageously represents a telephone subscriber loop which, in the normal on-hook condition, provides no current to the bias winding 21. If the subscriber loop is in the off-hook condition, i.e., seeking service, a bias current is supplied to the winding 21 for producing in branch circuit 16 a magnetomotive force that tends to oppose the switching of that branch to the clockwise set condition. This bias current is advantageously arranged so that the resulting effective reluctance of the inner magnetic path through branch 16 is greater than the effective reluctance of the outer path through branch 17, these reluctances being considered with respect to a setting magnetomotive force produced by drive current in winding 11. Consequently, the next set pulse which is applied to winding 11, while the source 22 is providing the off-hook bias current, causes device 12 to be set; but, in the process of setting, the branch 17 now switches before the branch 16 because the former branch now has a lower effective reluctance. This switching sequence produces the output dipulse waveform illustrated in FIG. 2 for the with-bias condition. In this case the negative-going portion of the dipulse precedes the positive-going portion thereof, just the opposite of the setting sequence which resulted in the absence of bias but the same as the resetting sequence either with or without bias.

Further in accordance with the invention, and as previously noted herein, signals in the output winding 18 are applied to the polarity sequence detector 20. The latter circuit is adapted to produce an output pulse in response to only one predetermined sequence of dipulse polarities received from the winding 18. The form of the detector illustrated in FIG. 1 is advantageously adapted to respond in the manner indicated to a dipulse wherein the positive portion precedes the negative portion so that the detector 20 provides an output pulse to a utilization circuit 23 each time that the transfluxor 12 is set, while the source 22 is in a condition corresponding to the on-hook, or open circuit, condition. Circuit 23 is advantageously a data channel utilizing line identification information in conjunction with the information in the output of detector 20 to provide appropriate supervision of line connections in a manner known in the art.

Input signals to the detector 20 are coupled by a capacitor 26 to the base electrode of an n-p-n transistor 27 that is biased for linear operation as an emitter-follower circuit. This emitter-follower acts as an input driver for the detector while at the same time providing a substantially uniform input impedance to the output circuit of the device 12. This uniform input impedance condition prevents a substantial charge of either polarity from being built up on the capacitor 26 and thereby blocking further operation of the detector.

An n-p-n transistor 28 is connected to operate as a pulse stretcher, and it receives input signals from the emitter circuit of transistor 27 by way of a direct-current coupling resistor 29 which is shunted by a speed-up capacitor 30. Transistor 28 is normally nonconducting and is biased so that each positive-going pulse received from the transistor 27 drives the transistor 28 into its saturated conduction condition. Such conduction in transistor 28 discharges a capacitor 31 that is connected between the collector and emitter electrodes thereof. After termination of conduction in transistor 28, capacitor 31 is charged positively by current from an operating potential source 32 which is schematically represented by a circled plus sign. The latter representation indicates the source has its positive terminal connected to the corresponding circuit point and its negative terminal connected to ground. The time required for charging capacitor 31 is dependent upon its time constant in a series charging path including resistors 33 and 36. This time constant is advantageously arranged to include at least the time interval of a full dipulse from the output winding 18. Consequently, the pulse stretcher supplies at the collector electrode of transistor 28 a negative-going pulse in response to each no-bias setting dipulse and of a duration corresponding to the duration of such dipulse.

The negative-going pulse from transistor 28 is coupled through a series combination of a resistor 37 and a coupling capacitor 38 to the base electrode of an n-p-n transistor 39, which is one of the input devices for a two-transistor AND gate. Bias provided to the base electrode of the latter transistor by way of a resistor 40 causes that transistor to be normally conducting at a saturated conduction level in the absence of negative pulses applied from capacitor 38. An n-p-n transistor 41 comprises the second transistor of the aforementioned AND gate, and it is also normally biased for conduction at a saturated level by the action of a potential divider including resistors 42 and 43 which are connected in series across the terminals of source 32.

Dipulses from the output winding 18 which are applied to transistor 27 are also coupled through a lead 46 and a coupling capacitor 47 to the base electrode of transistor 41. If a negative pulse is thus applied to the base electrode of transistor 41 while transistor 39 is in a nonconducting condition, both of the transistors 39 and 41 are driven to such a nonconducting condition; and a positive-going output pulse is coupled from their common collector terminal 48 to the utilization circuit 23. If, however, the bias from source 22 had caused a reversal in the sequence of switching for branches 16 and 17 in device 12, the initial negative-going portion of the with-bias setting dipulse leaves the transistor 28 in its nonconducting condition and transistor 39 in its conducting condition. In this state the terminal 48 is clamped to ground even though the same negative-going portion of the dipulse is coupled through capacitor 47 to turn off transistor 41. Consequently, the utilization circuit 23 receives no pulse from detector 20.

The previously described operation of detector 20 is thus inherently nonresponsive to any input pulse sequence wherein a negative-going pulse precedes a positive-going pulse. This is the condition which prevails when the bias applied by the source 22 so changes the reluctance of branch 16 that it is set after the setting of branch 17. Furthermore, upon resetting of these two branches, the dipulse produced in output winding 18 has a negative portion which precedes the positive portion as shown in FIG. 2. Consequently, the detector is also nonresponsive to such resetting output signals, and no time gating is required to suppress the effect of such resetting signals.

As the circuit of the invention has been described up to this point, the threshold for reversal of the switching sequence in branches 16 and 17 depends upon the relationship between the geometry of the transfluxor 12 and the magnitude of bias current which is available from the source 22. Thus, the bias current must so alter the effective reluctance of branches 16 and 17, in response to a setting signal from source 10, as to produce a greater net magnetomotive force in the outer branch 17 than is applied to the inner branch 16 in order to achieve the sequence reversal. This biasing magnetomotive force can, for example, be fixed in relation to the device geometry by using different numbers of bias circuit turns on at least one of the coupling branches of the device 12. Any appropriate ratio of $n$:1 for bias circuit turns on the two branches 16 and 17 may be used to produce the desired effect, and a 1:1 ratio of turns is actually illustrated in the embodiment of FIG. 1.

The total bias current is also advantageously controllable by including in the bias source 22 an adjustable reference current source which is schematically indicated by an adjusting knob 49 on the source 22 in FIG. 1. Such a reference source has a high terminal impedance and is connected in shunt with the portion of the source 22 which is actually supplying a current that is to be detected. Thus, the use of such a reference current source produces a direct-current level shift to an advantageous level for operating a particular magnetic device 12. For example, in a telephone system wherein the device 12 is part of a line scanning matrix, knob 49 is adjusted so that its current would produce in the winding 21, when the observed line is in the on-hook condition, a bias current of insufficient magnitude to cause the coupling branches 16 and 17 to have substantially the same effective reluctance for switching magnetomotive forces produced by setting pulses applied to input winding 11. Under conditions of equal effective reluctance the coupling branches would switch at substantially the same time, thereby producing substantially equal and simultaneous pulses of opposite polarity in the output winding 18 so that no significant output signal is coupled from that winding to detector 20.

However, when biased below the balanced, or equal effective reluctance, state by the reference source 49, branches 16 and 17 switch in their normal no-bias sequence on each setting pulse. This action operates detector 20 as previously described to provide a pulse to the utilization circuit 23. When the line under observation goes to the off-hook condition corresponding to closure of the subscriber loop, the loop current adds to the reference current thereby increasing the total bias and increasing the effective reluctance of the branch 16 to a level which is higher than the reluctance of the branch 17 with respect to setting signals from source 10. Consequently, on the next setting pulse branch 17 switches before the branch 16 for applying to the detector 20 a dipulse sequence of negative-positive pulse portions. The detector is nonresponsive to this sequence and provides no pulse to circuit 23.

It is apparent, of course, that a plurality of transfluxors 12 may be arranged in a matrix array to be supplied selectably with drive current pulses on a coincident current selection basis in a manner that is well known in the art. Each transfluxor would receive bias current from a separate source representing a different circuit which is to be observed. However, all or any part of the transfluxors in such array may be coupled to a single sensing circuit which would include the output winding 18 of each of such devices in series across the input of a common polarity sequence detector. It is in this latter matrix environment in which the transfluxors would be subject to half-select drive signals shuttling through large apertures and producing shuttle noise voltages in their output windings. Such noise conditions make it highly advantageous to be able to detect a desired condition of a particular line selected for observation even though the output signal from such line may be at least partially masked by the aforementioned shuttle noises.

Although the present invention has been described in connection with one particular embodiment thereof, it is to be understood that additional embodiments and modifications of the invention which will be obvious to those skilled in the art are included within the spirit and scope of the invention.

What is claimed is:

1. In combination:

a magnetic device having a large aperture and a small aperture and having at least two states of stable magnetic flux remanence between which it can be switched, said device having two coupling magnetic circuit branches defining said small aperture and having a common magnetic circuit branch which, together with one of said coupling branches, defines said large aperture, said branches being dimensioned so that the switching of said common branch between said two states causes said two coupling branches to be switched in a predetermined time sequence, means biasing at least one of said coupling branches to change sequential order of switching of said coupling branches, means switching said device between said two states, and means detecting the sequence of switching of said coupling branches.

2. The combination in accordance with claim 1 in which said detecting means comprises:

a pulse stretching circuit, an output winding coupling said coupling branches to said stretching circuit, said stretching circuit being responsive to only a first polarity of pulse in said winding for producing an output signal having a duration at least equal to the time interval required for both of said coupling branches to switch in said sequence, a coincidence circuit having a first input connection coupled to receive said output signal for enabling said coincidence circuit in response to said first polarity of pulse in said winding, and means further coupling said winding to a second input of said coincidence circuit for actuating the latter circuit in response to a second polarity of pulse in said winding.

3. The combination in accordance with claim 2 in which said biasing means comprises:

a bias winding coupled to said coupling branches, and means supplying current to said bias winding for applying a magnetomotive force to at least one of said coupling branches, said force being proportioned with respect to the geometry of said device so that said first branch switches after said second branch in response to said switching means.

4. The combination in accordance with claim 1 in which:

said first branch has a lower reluctance in the absence of bias than a second one of said branches in response to said switching means, said biasing means comprises a bias winding coupled to said first branch, and means supply current to said bias winding for applying a magnetomotive force to said first branch for making the net effective reluctance of said first branch greater than the net effective reluctance of said second branch in response to said switching means.

5. The combination in accordance with claim 4 in which:

said detecting means includes an output winding coupled to said coupling branches, said switching means alternately sets said device in a first of said states and resets said device to a second of said states thereby producing in said output winding, in the absence of bias, first and second bipolar pulse pairs, respectively, said pairs having opposite polarity sequences, and said detecting means includes means responsive to only one of said sequences for producing an output pulse.

6. The combination in accordance with claim 1 in which said biasing means includes:

a bias current source and a bias winding coupling the output of said source to said first branch, and said winding has a predetermined number of turns around said first branch whereby the magnetomotive force produced by said bias current makes the net effective reluctance of said first branch greater than the net effective reluctance of a second one of said branches in response to said switching means.

7. In combination:

a magnetic device having a large aperture and a small aperture and having at least two states of stable magnetic flux remanence between which it can be switched, said device having two coupling magnetic circuit branches defining said small aperture and having a common magnetic circuit branch which, together with one of said coupling branches, defines said large aperture, said branches being dimensioned so that the switching of said common branch between said two states causes said two coupling branches to be switched in a predetermined time sequence, means biasing at least one of said coupling branches to change the effective reluctance of at least a first one thereof, said biasing means comprises a bias winding coupled to said coupling branches, means switching said device between said two states, means detecting the sequence of switching of said coupling branches, and means supplying current to said bias winding for applying a magnetomotive force to one of said coupling branches, said force being proportioned with respect to the geometry of said device so that said first branch switches after a second one of said branches in response to said switching means.

8. The combination in accordance with claim 7 in which:

said current supplying means includes means selectably shifting the level of current supplied thereby for proportioning said force.

References Cited

UNITED STATES PATENTS

| | | | |
|---|---|---|---|
| 2,992,415 | 7/1961 | Bauer | 340—174 |
| 3,108,194 | 10/1963 | Weller | 307—88 |

OTHER REFERENCES

IBM Technical Disclosure Bulletin, "Analog to Digital Converter," by Melan et al., vol. 2, No. 2, Aug. 8, 1959, pp. 19–20.

STANLEY M. URYNOWICZ, Jr., Primary Examiner

U.S. Cl. X.R.

340—174